US009692867B2

(12) United States Patent
Nair (10) Patent No.: US 9,692,867 B2
(45) Date of Patent: Jun. 27, 2017

(54) EVENT ACCESSORY ITEM LOCATION (71) Applicant: HERE Global B.V., Veldhoven (NL)

(72) Inventor: Prasanth Nair, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/561,602

(22) Filed: Dec. 5, 2014

(65) Prior Publication Data
US 2016/0163164 A1    Jun. 9, 2016

(51) Int. Cl.
H04M 1/725    (2006.01)
G08B 21/24    (2006.01)

(52) U.S. Cl.
CPC ........... *H04M 1/7253* (2013.01); *G08B 21/24* (2013.01); *H04M 1/72572* (2013.01)

(58) Field of Classification Search
CPC ............................... H04W 88/02; H04W 12/06
USPC ................... 455/557, 411, 418, 456
See application file for complete search history.

(56) References Cited

U.S. PATENT DOCUMENTS

| | | | | |
|---|---|---|---|---|
| 6,618,593 B1* | 9/2003 | Drutman | ............ | G08B 21/0222 342/357.31 |
| 6,680,675 B1* | 1/2004 | Suzuki | ................... | G01C 21/34 340/539.13 |
| 7,107,221 B1* | 9/2006 | Tracy | ..................... | G06Q 20/20 705/26.81 |
| 8,013,734 B2* | 9/2011 | Saigh | ................ | H04M 1/72541 340/539.1 |
| 8,457,653 B2* | 6/2013 | Ledlie | ................... | G01S 5/0236 455/404.2 |
| 8,489,599 B2* | 7/2013 | Bellotti | ............. | G06F 17/30032 707/736 |
| 8,581,953 B2* | 11/2013 | Kim | ....................... | H04N 7/147 348/14.01 |
| 8,713,593 B2* | 4/2014 | Humphrey | ........ | G06F 17/30026 704/200 |
| 8,788,496 B2* | 7/2014 | Darby, Jr. | .............. | G06Q 10/06 707/736 |
| 8,856,226 B2* | 10/2014 | Boda | ...................... | H04M 3/42 709/201 |
| 9,142,116 B2* | 9/2015 | Sattari | ..................... | G08B 21/24 |
| 9,377,319 B2* | 6/2016 | San Filippo | ....... | G01C 21/3423 |
| 2002/0067308 A1* | 6/2002 | Robertson | ............... | G01C 21/00 342/357.395 |
| 2005/0136903 A1* | 6/2005 | Kashima | ........... | H04M 1/72563 455/418 |
| 2008/0284587 A1* | 11/2008 | Saigh | ................ | H04M 1/72541 340/539.13 |
| 2010/0134588 A1* | 6/2010 | Kim | ....................... | H04N 7/147 348/14.02 |
| 2010/0138416 A1* | 6/2010 | Bellotti | ............. | G06F 17/30056 707/736 |

(Continued)

OTHER PUBLICATIONS

Umbrella Reminder, Android Apps on Google Play, Accessed Nov. 4, 2014.

*Primary Examiner* — Hai V Nguyen
(74) *Attorney, Agent, or Firm* — Lempia Summerfield Katz LLC (57) ABSTRACT Events may have associated accessories that facilitate participation and/or completion of an event. The accessories may be associated with respective events. A particular event may be detected which may trigger the identification and location of accessories associated with the particular event. The locations of associated items may then be provided.

21 Claims, 6 Drawing Sheets (56) References Cited

U.S. PATENT DOCUMENTS

| | | | |
|---|---|---|---|
| 2010/0199287 A1* | 8/2010 | Boda | H04M 3/42 718/108 |
| 2010/0306249 A1* | 12/2010 | Hill | G06F 17/30867 707/769 |
| 2011/0087662 A1* | 4/2011 | Darby, Jr. | G06Q 50/08 707/736 |
| 2012/0216226 A1* | 8/2012 | Humphrey | G06F 17/30026 725/34 |
| 2012/0220308 A1* | 8/2012 | Ledlie | G01S 5/0236 455/456.1 |
| 2013/0036139 A1* | 2/2013 | Kung | G06Q 10/025 707/780 |
| 2014/0104656 A1* | 4/2014 | Crisp | G06Q 30/0276 358/1.18 |
| 2014/0145845 A1* | 5/2014 | Sattari | G08B 21/22 340/539.13 |
| 2014/0277735 A1* | 9/2014 | Breazeal | B25J 11/0005 700/259 |
| 2014/0278071 A1* | 9/2014 | San Filippo | G01C 21/3423 701/465 |
| 2014/0278086 A1* | 9/2014 | San Filippo | G01C 21/3423 701/527 |
| 2015/0087264 A1* | 3/2015 | Goyal | G01S 19/34 455/411 |
| 2015/0318020 A1* | 11/2015 | Pribula | H04N 21/43615 386/227 |

\* cited by examiner

EVENT ACCESSORY ITEM LOCATION

FIELD

The following disclosure relates to item location, and more specifically to providing locations of accessory items associated with events.

BACKGROUND

Mobile device users are provided with significant amounts of data. Some of this data may involve weather predictions, daily agendas, or other data related to activities of mobile device users. For example, weather applications and daily scheduling applications may contain data related to activities for a user. Also, specific items may be useful for particular activities, or be considered accessory items for such activities. Often these items may not be accessible, convenient, and/or readily apparent to the mobile device user, particularly as they relate to preparing for daily activities of the user. Therefore, a user may not have acquired items particularly suited to being an accessory for an activity.

SUMMARY

In an embodiment, a method may involve detecting data indicative of an event. The method also may involve identifying, in response to the detecting, at least one accessory item associated with the event. The method may also involve determining based on a signal provided by a mobile device associated with the accessory item, a geographic location of the identified at least one accessory item associated with the event, and providing an indication of the geographic location of the at least one associated accessory item.

In an embodiment, an apparatus may involve at least one processor and at least one memory including computer program code and operable to store a data indicative of an event. The at least one memory and the computer program code may be configured to, with the at least one processor, cause the apparatus at least to detect the event, identify an item associated with the event in response to the detection of the event, and determine a location of the item associated with the event. The location may be determined based on a signal provided by a mobile device associated with the item. The at least one memory and the computer program code may also be configured to, with the at least one processor, cause the apparatus at to provide an indication of the location of the associated item.

In an embodiment, a non-transitory computer readable medium including instructions that when executed on a computer may be operable to detect data indicative of an event, identify an item associated with the event, and provide an indication of the location of the associated item.

BRIEF DESCRIPTION OF THE DRAWINGS

Exemplary embodiments of the present invention are described herein with reference to the following drawings.

DETAILED DESCRIPTION

Programs and/or services may provide data to a device, such as a mobile phone or other computer, which indicates that a user of the device will experience an activity in the foreseeable and/or immediate future. The activity may be an event such as a planned or forecasted event. For example, program on a computer may receive data from a weather prediction application that indicates that rain is predicted for an area. This data may trigger a device to identify items that may be useful for the event. In the above example, the device may identify an umbrella and/or a suitable coat based on the rain prediction. These items may then be located, and the locations provided to a user of the device. For example, the umbrella may have an attached mobile device that can communicate a location of the umbrella to the user device and/or user. Then, using the provided location, the user may find and acquire the item for use with the detected upcoming event. As such, devices, systems, and methods are described herein to alert a user to carry items so as to be prepared for events, show the location of items, and/or verify possession of an item by a user.

As indicated above, in an embodiment, a user may receive data on a mobile device that indicates that the user will experience rain during the day. The mobile device may identify an umbrella and determine a location of the umbrella, for example with another mobile device attached to the umbrella. The location of the umbrella may be provided to the user, such as with a map including a floor plan of a house, wherein the location of the umbrella is designated on the floor plan. Further, the mobile device may determine that the umbrella has been acquired by the user by determining whether the mobile device associated with the umbrella is within a predetermined proximity or distance of the user's mobile device.

Other examples may be provided as well. For instance, a device may receive information that indicates that a train that the user typically rides is experiencing a delay. The device may identify keys to an automobile as an alternative mode of transport for the user, and provide a location of the keys to the user. The keys may have an attached mobile device that can alert the user as to the location of the keys. In another example, a device may detect that a user has an upcoming doctor appointment during the day, and before the user leaves home for the day, the device may alert the user to the appointment and provide a location of useful documentation items such as an insurance card. In such an example, the insurance card may be attached to a location determinative mobile device, or the location determinative mobile device may be attached to a wallet or other storage device with which the insurance card is associated.

Also, a television programming application may indicate that a broadcast of a particular television show is about to occur. In response a mobile device may alert a user of this event and provide the location of a remote control for a nearby television.

Further, event activities may be scheduled and items suitable for participation in such events may be located. In an embodiment, a weather application may provide data that is interpreted by a user device to indicate that a particular type of activity may be successfully partaken. For example, the weather application data may indicate that a day will be sunny and warm. The mobile device may use this data to determine that the sunny and warm characteristics meet the criteria for golfing. As such, the mobile device may provide a location of a set of golf clubs to a user prior to the user leaving home that day. Similarly, the weather application may indicate that it is cold, clear, and that there is a certain level of snow on the ground. In such an example, these characteristics may direct the mobile device to indicate the location of appropriate ski gear to a user of the mobile device.

Figure 1:
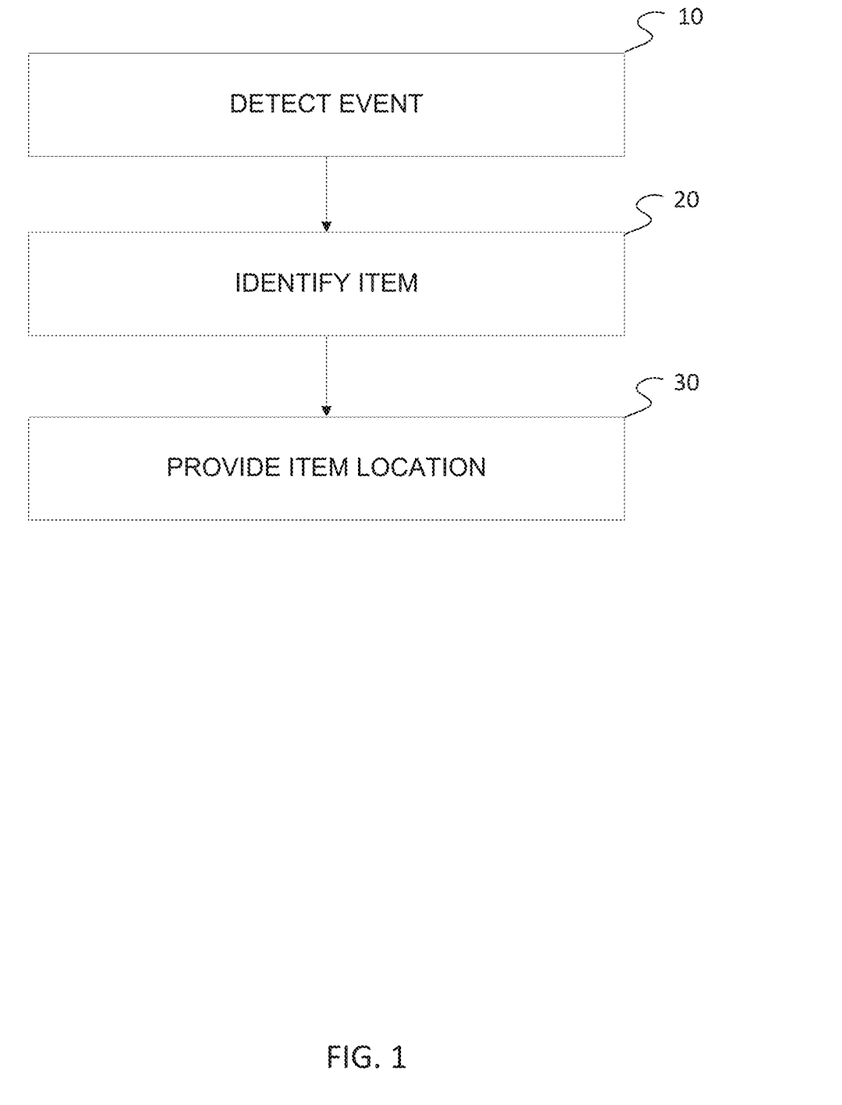
FIG. 1 illustrates a flow chart of an example embodiment for location of event accessories.

FIG. 1 illustrates a flow chart of an embodiment of event accessory location. The event may be an event for a user of a mobile device, such as the mobile device 122 described below with respect to FIGS. 4 and 5. As presented in the following sections, the acts may be performed using any combination of the components indicated in FIG. 4, FIG. 5, or FIG. 6. For example the term controller may refer to either controller 200 of or processor 300 and the following acts may be performed by one or more mobile devices 122, servers 125, or a combination thereof. Additional, different, or fewer acts may be provided. The acts are performed in the order shown or other orders. The acts may also be repeated.

In act 10, an event is detected. The event may be detected from data indicative of the event. The data may be identified from other data stored on a disk or memory, received through a communicative transmission, or other means. The data may be any data indicative of an event. For example, the data may include a time and/or place for a scheduled event or data that implies an event such as a collection of characteristics that when taken together indicate that an event may occur or that partaking in an event may be possible. Weather, schedule, or any other data may be indicative of an event. Further, the data may be provided by particular applications, such as weather applications and/or scheduling applications, and used by a device, or devices, to determine an event. Also, the event may be an upcoming event, or an event already underway or currently occurring.

In an embodiment, a dedicated program may involve directing the communication between devices and/or separate information sources to detect events and provide event item locations. Further, this dedicated program may have an individual icon on a home screen of a mobile device for selection and/or activation of the program. Also, such a dedicated program may receive data for detection of events from separate programs and/or services. In another embodiment, the program for detecting events and providing event item locations may be integrated with another program, or programs, such that the event item location program may provide an integrated function with other applications, or programs.

The event may be any event. An event may involve specific types or categories of events. For example, weather data may indicate weather categories of events. For example, weather data indicating that a location will be effected by a rainstorm. Further, the location may include the current or predicted position of a user of a device. The rainstorm may be considered a weather event. Also, schedule data may indicate a doctor appointment at a specific time and/or location. The appointment may be considered an event. Further, unscheduled activities, such as playing golf or skiing may be considered events when characteristics indicate that participation in the activity is suitable and/or feasible.

Events may involve characteristics, and data may be analyzed to determine the existence of these characteristics. For example, a golf event may involve weather characteristics such as chance of rain, temperature, and wind. Further, combinations of data types and/or categories may be used to establish characteristics for events. For example, the weather characteristics may be combined with schedule characteristics. Specifically, the schedule characteristics may be determined from schedule data that indicates that a user has no scheduled meetings after 1:00 PM that particular day. This schedule characteristic along with the weather characteristics may indicate a golf event.

In act 20, an item is identified. The identification of an item may be triggered by the detection of an event in act 10. The item may be an item that can be used as an accessory during participation in the detected event. The item may be any tangible and/or physical object with which users may equip themselves with during an event. For example, users may equip themselves with an umbrella during a rain event, golf clubs during a golf event, and/or any other item deemed suitable for a detected event. Further, multiple items may be identified for an event. For example, a coat and an umbrella may be identified for a rain event.

The item may be associated with the detected event. For example the item may be associated with the detected event in a relational table. The table may include multiple items, each of which is associated with an event. Further, a single item may be associated with multiple events. For example, a coat may be associated with a cold weather event and a ski event.

In act 30, the location of the item is provided. The location may be provided using any technique operable to make a user aware of a location of the item. The location of the item may be pre-established and associated with the item or determined in real-time upon the identification of the item. For example, a location for a coat may be established as a closet in a house. As such, whenever the coat is identified, the closet location may be provided. Also, in an embodiment, the location may be determined in real-time such as by location identifying technology. For example, the item may have a mobile device, such as the mobile device 122 described below with respect to FIGS. 4 and 5, physically attached, or located proximate to, the item. The mobile device 122 may be a simplified device configured with circuitry to merely provide the location of the item. The mobile device may be associated with the item, and configured to provide the location of the item. Further the mobile device 122 may be integrated with the item, such as by being physically attached to the item. For example, the mobile device 122 may be sewn into the lining of a coat, or attached to the handle of a golf bag.

The mobile device 122 may indicate the location of the item using any technique. In an embodiment, the item mobile device may include position circuitry 207 and a communication interface 205 as described below with respect to FIG. 5. The item mobile device may use the position circuitry 207 to determine a position of the device, and as such a position of the item. The item mobile device may then communicate this location information to another device, such as a user mobile device and/or a server.

In an embodiment, the item mobile device may include the output interface 211 described below with respect FIG. 5. As such, the item mobile device may receive a request for a location of the item from another device. In response to such a signal, the item mobile device may output a signal indicative of a location of the item. The output signal may be an audible signal, such as a beep, or visual signal, such as a light, alerting a user of the geographic location of the item. This responsive signal may be considered a locating signal. In this way, a location of an item may be provided to a user without position circuitry.

Figure 3:
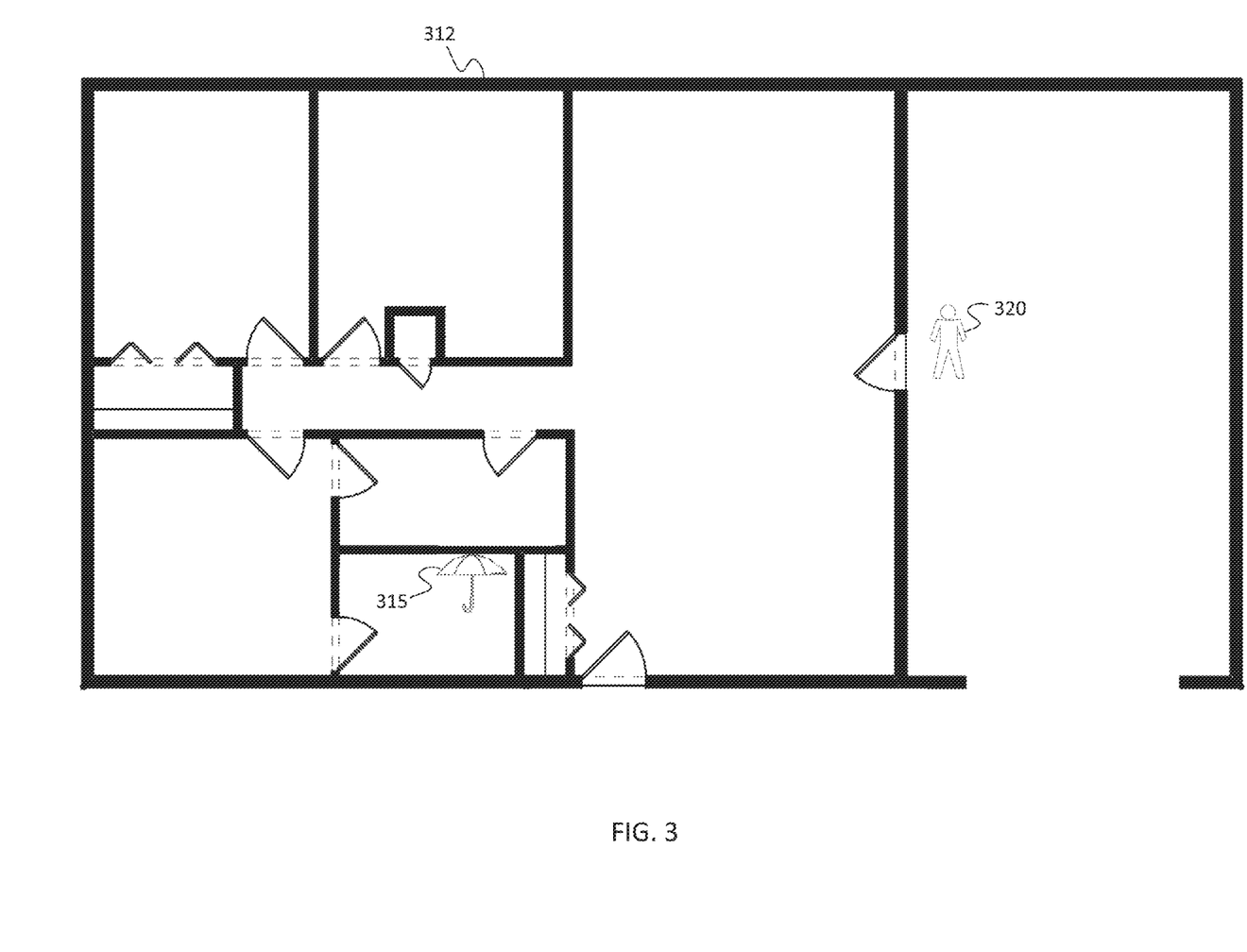
FIG. 3 illustrate an exemplary location of an event accessory.

In an embodiment, a specific geographic location of the item mobile device is determined, such as by using position circuitry. This geographic location may be correlated to a map of the area containing the item. This map may then be presented using any technique. For example, the map may be presented to the user of a mobile device using a display, such as the output interface 211. In an embodiment, the map may involve a floor plan of a house, such as is illustrated with respect to FIG. 3. The item location may then be indicated on the floor plan.

Figure 2:
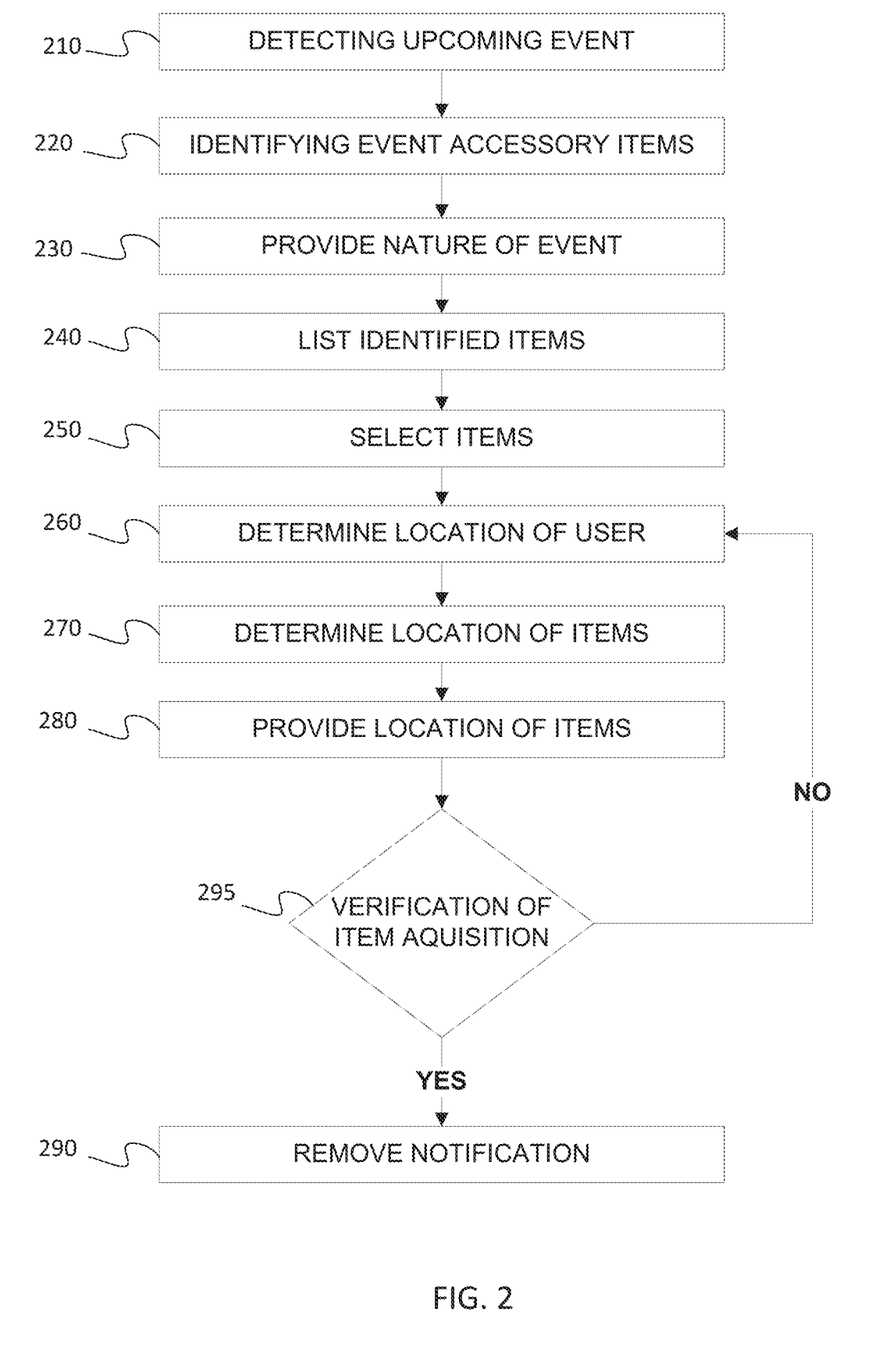
FIG. 2 illustrates another flow chart of an example embodiment for location of event accessories.

FIG. 2 illustrates an example embodiment for location of event accessory items. As presented in the following sections, the acts may be performed using any combination of the components indicated in FIG. 4, FIG. 5, or FIG. 6. For example the term controller may refer to either controller 200 of or processor 300 and the following acts may be performed by one or more mobile devices 122, servers 125, or a combination thereof. Additional, different, or fewer acts may be provided. The acts are performed in the order shown or other orders. The acts may also be repeated.

In act 210, data indicative of an upcoming event may be detected. In an embodiment, detecting data indicative of an event may be considered detecting the event. An event may be any event. For example, an event may be an occurrence of inclement weather, a current status of a transportation system, weather conducive to an activity, or any other event.

The data may be provided by any program, service, and/or source. For example, a weather program, device, and/or service may provide data indicating weather predicted for a day. This data may be interpreted to indicate a weather event. For example, the weather data may indicate that the temperature will be warm, but that rain is predicted for some time during the day. This rain prediction may be detected as an event. Also scheduling programs, devices, and/or services may provide data indicating specific events which are scheduled for a particular time. These scheduled events may be detected. For example, a scheduled event may be a daily time a user leaves home for a daily commute. The time for this event may be stored in a scheduling application, and detected.

Also, characteristics may be indicated by data that implies an activity may be available. For example, weather data may indicate that it will be sunny and warm. These characteristics may be suggestive of an activity, such as golf. The suggestive activity may be considered an event.

In act 220, at least one accessory item associated with the event may be identified. The identification of the accessory item, or items, may be in response to the detection of an event in act 210. A single item may be identified, or a group or plurality of items may be identified.

An item identified as an accessory item for an event may be an item that is deemed suitable for an event. For example, an event may be weather suggestive of an activity, such as sunny and warm weather for golf. The accessory may be an accessory item for that activity, such as a set of golf clubs. In another example, an event may be a transportation system impediment, such as a broadcasted commuter train delay, and the identifying an accessory involves identifying an automobile key or a collection of keys containing an automobile key. In yet another example, an event may be inclement or rainy weather, and identifying an accessory may involve identifying a coat, umbrella, or both.

In an embodiment, a user may provide a list of associated items for particular events. For example, a user may choose specific items to associate with specific events, such as a particular coat and a particular umbrella for rain events, or a particular set of golf clubs for golf events. In another embodiment, items may have associated characteristics which deem an item suitable for an event. For example, a stocking cap may have associated a "cold weather" characteristic. Thus, when a cold weather event is detected, the stocking hat may be identified.

Items may be associated with events using any technique. In an embodiment, the items may be listed in an associative data table structure indicating that the items are associated with particular events. As such, when an event is detected, the items associated with the event in the table will be identified. Further, in an embodiment, a user may manage the table by choosing particular items to associate with events.

In act 230, a notification of the nature of the event may be provided. The nature may be any characteristic and/or descriptor of the event. For example, a nature of a rain event may be rain. Similarly, a nature for a golf event may be golf.

The nature may be provided using any technique. For example, a nature may be provided as a message and/or pop-up window on a display of a user. The nature may be provided using text, i.e. "Golfing Today?" for a suggestive golf event, images indicative of an event, i.e. rain clouds for a rain event, audible sounds indicative of an event, i.e. a foghorn for a cold fog event, as well as any other indication and/or combination thereof.

In act 240, a list of the identified items may be provided. The list may include a group or collection of items identified as accessory items for an event. The list may be provided as a pop-up window and/or message to a user of a display, such as a display on a mobile device. Further, in act 250, a selection of at least one of the listed accessory items may be made. In an embodiment the selection may be made and/or received using a mobile device of a user.

Also, in act 260, a location of a user may be identified. The location of a user may be a location of a mobile device, determined as is described below with respect to the mobile device 122 of FIG. 5.

In act 270, a geographic location of the identified at least one accessory item associated with the event may be determined. The geographic location of the identified item, or items, may be determined based on a signal provided by a mobile device associated with the respective item. The mobile device associated with the item may be a fully functional mobile device, or a simplified mobile device merely operative to provide and/or indicated a location of the mobile device when requested. A fully functional mobile device may include most or all of the components indicated in FIG. 5, whereas an item mobile device may merely involve communication circuitry and/or position determining circuitry. Further, in an embodiment, an item mobile device may merely include proximate location determination technology, such as radio frequency identification ("RFID") location determinative technology. For example, a user mobile device may emit a radio frequency signal which is used by the item mobile device to provide power to circuitry that generates a signal. This signal may be detectible by the user mobile device, and operable to indicate a location of the item mobile device. Other communicative capabilities may be used for mobile device location as well. For example, close distance inter-device communication technology, such as circuitry operative to communicate using the Bluetooth communication protocol, may be used.

The mobile device may be associated with the item using any technique operable to indicate that a location of the associated mobile device indicates the location of the item. For example, item mobile devices may have individual identifiers. These individual identifiers may be associated with the items in an associative table data structure. Signals and/or data indicating a location of the mobile device may include data indicative of this identifier. The identifier may then be used determine the item for which the signal is indicating a location. Also, the individual identifiers may indicate individual communicative protocols that facilitate identification of the particular item mobile devices on a network, and allow communication with particular mobile devices of a group of mobile devices.

In an embodiment, a signal may be transmitted from a mobile device of a user to a mobile device associated with the identified object. The signal may be operational to cause the mobile device of the identified object to transmit a location and/or a locating signal. The locating signal may be operative to determine the location of the item and/or the mobile device associated with the item.

In act 280, an indication of the geographic location of the at least one associated accessory item may be provided. The indication may be provided using any technique. For example, the location may be provided using text, such as "The umbrella is in the hall closet", or by presenting a map indicating the geographic location of the item. A map may be any type of map operable to convey graphical geographic information of a geographic area. For example, the map may be the floor plan map 312 illustrated in FIG. 3. The map may include an indication of the geographic location of the item 315 displayed as a position on the map 312. The position may be indicated using any technique, for example an icon representative of the item, such as a picture of an umbrella, may be positioned on the map to indicate the geographic location of the item.

The map may be provided to a mobile device of a user by another device, such as the server 125 described below with respect to FIGS. 4 and 6, or may be generated by the mobile device of the user. The map may be presented and/or provided to the user by displaying the map on an output of the user mobile device. Also, the map may be provided by any source. In an embodiment, a user may develop or upload a map such that the map may be used to indicate geographic locations of items. For example, a user may upload a picture of a floor plan for the user's home to a mobile device, and subsequently the mobile device may orient the uploaded floor plan to a coordinate system used by other mobile devices associated with items such that geographic locations provided by the item mobile devices may be displayed on the floor plan.

In an embodiment, the geographic location may be shown relative to a location of a user mobile device. For example, again with reference to FIG. 3, a location of a user mobile device 320 may be indicated on a map 312 along with an indication of the geographic location of the item 315. In an embodiment, the locations of the user mobile device 315 and the item 320 may be continuously, repeatedly, or periodically updated to indicate a user's progress in acquiring the device. Further, the map may be displayed on the user mobile device.

In an embodiment, when the user mobile device location 315 and the item geographic location are within a determined distance of each other, such as a distance threshold, the item may be considered acquired by the user, and the map, as well as other notifications, may be removed, as is described below with respect to acts 290 and 295.

Also, in an embodiment involving multiple identified items and a selection thereof, the providing of an indication of the geographic location may involve providing an indication of the geographic location of at least one selected accessory item. An embodiment may also involve indicating the locations of multiple items.

In act 295, acquisition of the identified item, or items, may be verified. The acquisition may be verified using any technique. In an embodiment, an item may be considered acquired by a user when a distance between the location of the object and a location of the user is less than an established distance threshold. To determine such a proximity validation, locations of the user and the identified item, or items, may be determined repeatedly and/or periodically.

Other techniques may be used to verify acquisition of the item as well. For example, capacitive, inductive, laser rangefinder, radar, photocell, sonar, Hall effect, or any other proximity sensing technique may be used. Further, a user may provide input, such as selecting an option in a provided interface, which indicates that the item has been acquired.

In act 290, notifications provided regarding the identified items may be removed. The removal of the notifications may be in response to an affirmative verification of the acquisition of the items. For example, locations of the item and a user may be determined to be sufficiently close to each other that the item is considered acquired. In another example, a mobile device associated with the item may detect movement, such as movement caused by a user picking up the item, and this detected movement may indicate acquisition of the item. The notifications may be removed using any technique. For example, the notifications, such as maps and/or text, may be removed from a display of a user mobile device when a distance between the user mobile device location 315 and the item location 315 is equal to or less than one meter.

Figure 4:
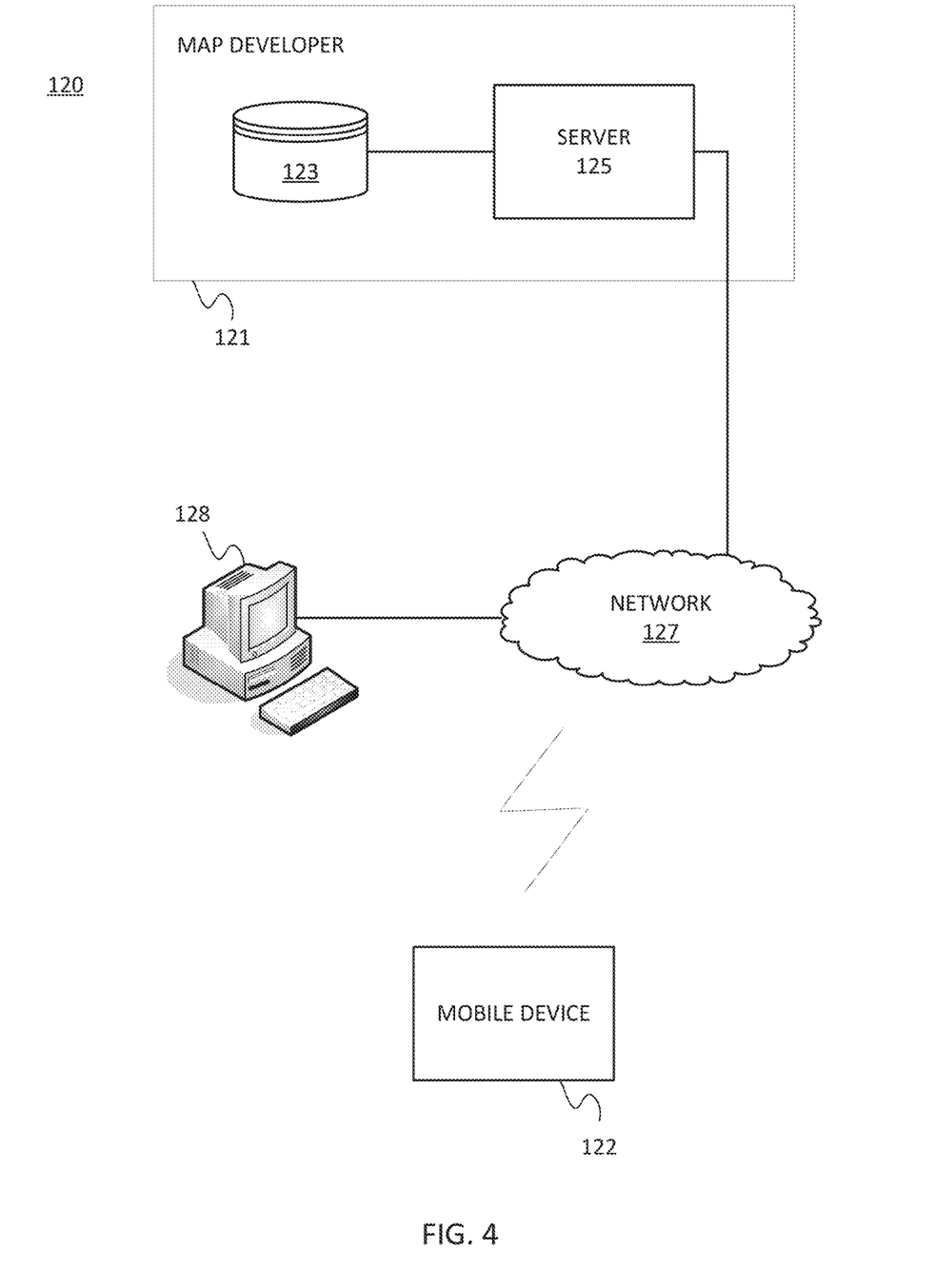
FIG. 4 illustrates an exemplary system for event accessory location.

FIG. 4 illustrates an exemplary system 120 for use in event accessory item location. The system 120 may include includes a developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for traffic, navigation, and/or enhanced imaging related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may also include maps of small or localized geographic areas, such as floor plans for houses and/or other buildings.

The mobile device 122 may include one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation, velocity, or acceleration. Movement information may also be determined using the positioning system. The mobile device 122 may use the detectors and sensors to provide data that may be used to further interact with localized maps of areas, such as floor plans.

The mobile device 122 may communicate location and movement information via the network 127 to the server 125. The server 125 may use the location and movement information received from the mobile device 122 to associate the mobile device 122 with a geographic region, or a road of a geographic region, described in the geographic database 123. Server 125 may also associate the mobile device 122 with a geographic region, or a localized area of a geographic region, manually.

The server 125 may receive location and movement information from multiple mobile devices 122 over the network 127. The location and movement information may be in the form of mobile device data. The server 124 may compare the mobile device data with geographic data stored in the database 123. This comparison may be used to determine a location of the mobile device relative to the geographic data or a geographic coordinate system used for the geographic data.

The computing resources for event accessory location may be divided between the server 125 and one or more mobile devices 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
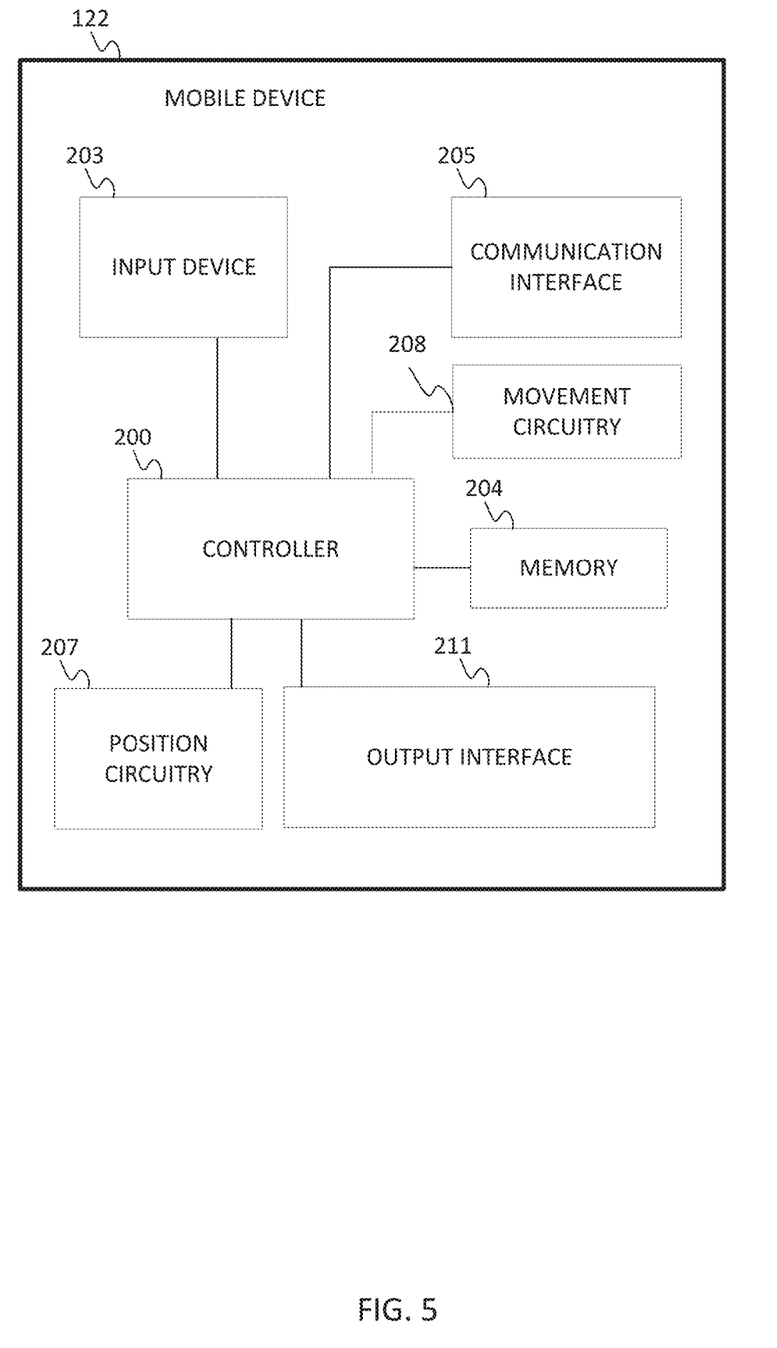
FIG. 5 illustrates an exemplary mobile device of the system of FIG. 4.

FIG. 5 illustrates an exemplary mobile device of the system of FIG. 4. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. For example, the mobile device may be a simplified mobile device which includes position circuitry 207 and/or a communication interface 207 configured to provide a location of an attached item. The mobile device 122 is a smart phone, a mobile phone, a personal digital assistant (PDA), a tablet computer, a notebook computer, a personal navigation device (PND), a portable navigation device, and/or any other known or later developed mobile device. The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system. In an embodiment, components as described herein with respect to the mobile device 122 may be implemented as an item location tracking device.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. In an embodiment, the communication interface 205 may be operate as position circuitry 207, such as by using Bluetooth communication protocols operable to indicate a relative location of one device from another.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data, device data, and/or mobile device data.

The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers. In an embodiment, the output interface 211 is operational to display an image of a geographic area. The image may be correlated to the current location of the mobile device using position circuitry 207. In an embodiment, the input device 203 may be operational to allow a user to select items from a presented list of items.

The communication interface 205 is configured to send mobile device movement and/or position data to a server 125. The position circuitry 207 is configured to determine the current location of the mobile device. The communication interface 205 may also be configured to send movement and/or position data by communicating directly with another mobile device 122.

In an embodiment, a set of instructions stored on the memory 204 may be configured to be executed by the controller 200 to cause the mobile device 122 to detect data indicative of an upcoming event, identify an item associated with the event, and provide an indication of the location of the associated item. The location of the associated item may be determined based on data indicative of a location of a separate mobile device attached to the item. The indication may be provided via the output interface 211 of the mobile device 122.

Figure 6:
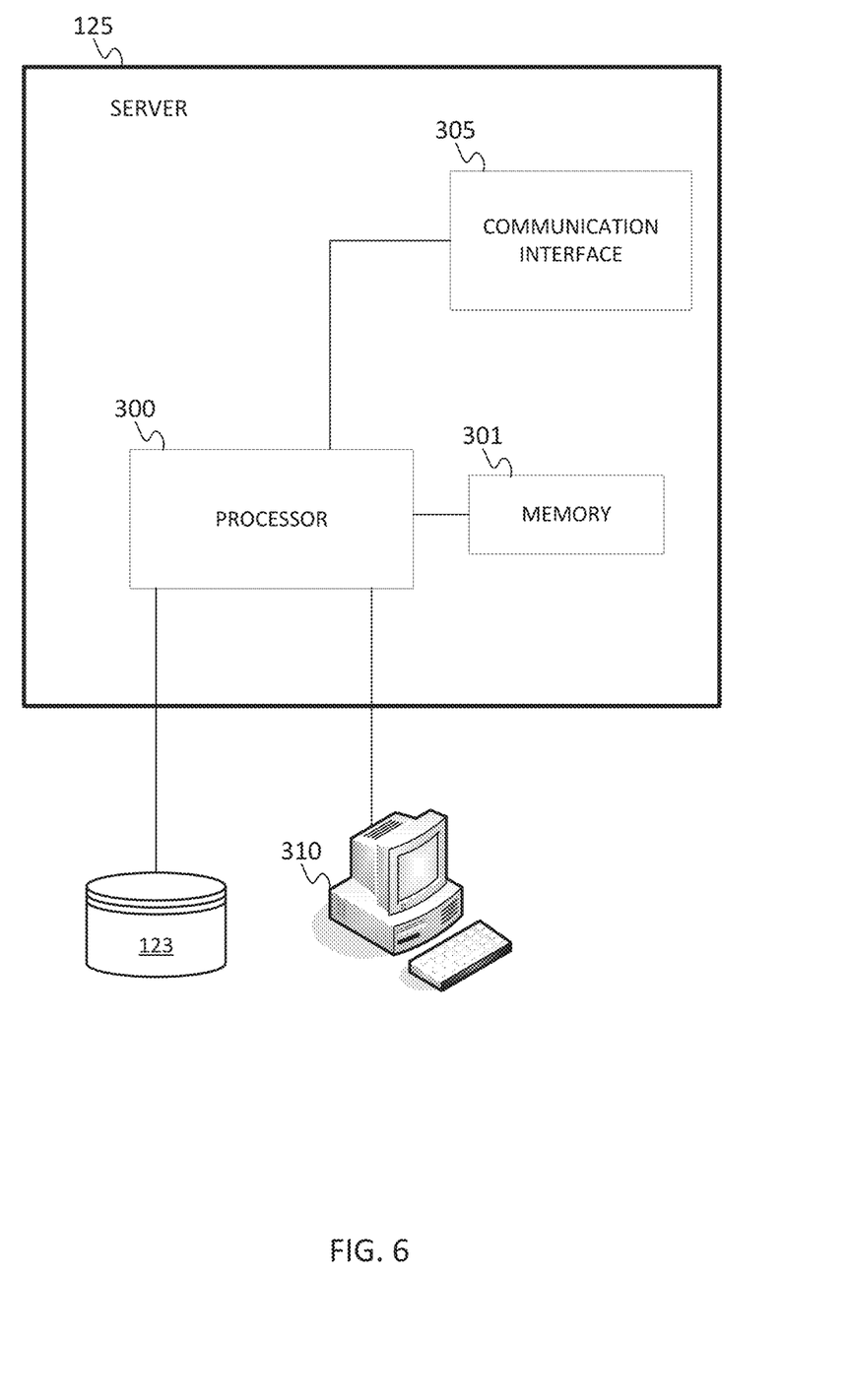
FIG. 6 illustrates an exemplary server of the system of FIG. 4.

FIG. 6 illustrates an exemplary server of the system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of inputs made via the mobile device 122. The communication interface 305 may also receive data indicative of locations of mobile devices 122. The communication interface 305 may also provide data indicative of detected events and other mobile device locations to the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

In an embodiment, the memory 204, 301 may include computer program code and operable to store a data indicative of an upcoming event. Further, the controller 200 and/or processor 300 may be configured to cause the mobile device 122 and/or the server 125 to detect the upcoming event and identify an item associated with the event in response to the detection of the event. The controller 200 and/or processor 300 may also be configured to cause the mobile device 122 and/or the server 125 to determine a location of the item associated with the event. The location of the item may be determined by establishing a location of a second mobile device 122 attached to the item. The second mobile device may provide a signal operative to indicate the location of the second mobile device. The signal indicating the location of the second mobile device 122 may be provided via the communication interface 205, 305 as directly communicated from the second mobile device or indirectly from the server 125. The signal may also be provided directly to a user of the mobile device, such as by outputting an audible or visual signal indicating the location of the mobile device attached to the item. The controller 200 and/or processor 300 may also be configured to cause the mobile device 122 and/or the server 125 to provide an indication of the location of the associated item. Further, the location of the item and/or the second mobile device may be indicated relative to the first mobile device. The indication may be provided via the output interface 211 of the mobile device and/or via a display of the workstation 310.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 305 may receive data indicative of locations of mobile devices 122. The communication interface 305 may also provide data indicative of detected events and other mobile device locations to the mobile device 122. Further, the communication interface 204 may be operable to communicate directly with other mobile devices 122. Any technique may be used to provide for the direct communication. For example, Bluetooth communication protocols may be used.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an embodiment, the set of instructions may be configured to be executed by the processor 300 to cause the server 125 to detect data indicative of an upcoming event, identify an item associated with the event, and provide an indication of the location of the associated item. The indication of the location may be provided to a mobile device 122 via the communication interface 305.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   detecting, by a processor, data indicative of an event;
   identifying, by the processor in response to the detecting, at least one accessory item associated with the event; wherein detecting of the data indicative of the event is independent of a geographic location of the at least one accessory item associated with the event;
   determining, by the processor based on a signal provided by positional circuitry in a mobile device associated with the accessory item, the geographic location of the at least one accessory item associated with the event; and
   generating, by the processor, a map including an indication of the geographic location of the at least one associated accessory item.

2. The method of claim 1, the method further comprising: providing a notification that describes the event.

3. The method of claim 1, wherein the identifying at least one accessory item associated with the event comprises identifying a plurality of accessory items.

4. The method of claim 3, further comprising:
   providing to a user a list of the plurality of identified accessory items; and
   receiving a selection of at least one of the accessory items, wherein generating the map including an indication of the geographic location comprises generating a map including an indication of the geographic location of the at least one selected accessory item.

5. The method of claim 1, wherein detecting data indicative of an event comprises detecting data indicative of inclement weather, and the identifying an accessory comprises identifying a coat, umbrella, or both.

6. The method of claim 1, wherein detecting data indicative of an event comprises detecting data indicative of a transportation system impediment, and the identifying an accessory comprises identifying an automobile key.

7. The method of claim 1, wherein detecting data indicative of an event comprises detecting weather conducive to an activity, and the identifying an accessory comprises identifying an item accessory item for that activity.

8. The method of claim 7, wherein the event comprises a time, and the identifying further comprises identifying in response to the time.

9. The method of claim 1, the method further comprising:
   transmitting a signal to the mobile device associated with the accessory item, the signal operational to cause the mobile device to transmit a locating signal.

10. The method of claim 9, wherein the locating signal comprises an audible signal.

11. An apparatus comprising:
at least one processor; and
at least one memory including computer program code and operable to store a data indicative of an event and data indicative of a floor plan;
the at least one memory and the computer program code configured to, with the at least one processor, cause the apparatus at least to:
detect the event;
identify an item associated with the event in response to the detection of the event; wherein the event is detected independently from a location of the item associated with the event;
determine the location of the item associated with the event, the location determined based on a signal provided by positional circuitry in a mobile device associated with the item; and
provide an indication of the location of the associated item on a visual representation of the floor plan.

12. The apparatus of claim 11, further comprising:
a display operable to present the indication of the location.

13. The apparatus of claim 11, further comprising:
location circuitry operable to determine a geographic location of the apparatus.

14. The apparatus of claim 13, wherein the indication of the location is a map of the floor plan indicating the location of the item relative to the location of the apparatus.

15. The apparatus of claim 13, wherein the event comprises a change in location of the apparatus.

16. The apparatus of claim 13, wherein the indication of the location is repeatedly provided until the apparatus is within a predetermined proximity of the mobile device.

17. The apparatus of claim 11, wherein the apparatus further comprises:
communication circuitry operable to communicate directly with the mobile device associated with the item.

18. The apparatus of claim 17, wherein the communication circuitry is operable to communicate with the mobile device using a Bluetooth wireless technology communication standard.

19. A non-transitory computer readable medium including instructions that when executed on a computer are operable to:
identify data representing a floor plan;
orient the floor plan or data thereof to a coordinate system;
detect data indicative of an event;
identify an item associated with the event; wherein detecting of the data indicative of the event is independent of a geographic location of the item associated with the event;
determine a location of the item associated with the event, the location determined based on a signal provided by positional circuitry in a mobile device integrated into the item; and
provide an indication of the location of the associated item on a visual representation of the floor plan or data thereof using the coordinate system.

20. The method of claim 1, wherein the positional circuitry in the mobile device is a global positioning system sensor.

21. The method of claim 1, wherein the positional circuitry in the mobile device is an accelerometer configured to detect the rate of change of translational movements of the mobile device.

* * * * *